US006826340B2

(12) United States Patent
Bennion et al.

(10) Patent No.: US 6,826,340 B2
(45) Date of Patent: Nov. 30, 2004

(54) OPTICAL PULSE TRANSMISSION LINES

(75) Inventors: Ian Bennion, Birmingham (GB); Sergei Konstantinovich Turitsyn, Birmingham (GB)

(73) Assignee: Aston University, Birmingham (GB)

( * ) Notice: Subject to any disclaimer, the term of this patent is extended or adjusted under 35 U.S.C. 154(b) by 0 days.

(21) Appl. No.: 10/156,758

(22) Filed: May 29, 2002

(65) Prior Publication Data

US 2003/0039436 A1 Feb. 27, 2003

(30) Foreign Application Priority Data

May 29, 2001 (EP) ............................................ 01304727

(51) Int. Cl.[7] .............................. G02B 6/00; G02B 6/34
(52) U.S. Cl. ....................................... 385/123; 385/37
(58) Field of Search ........................... 385/37, 123–128

(56) References Cited

U.S. PATENT DOCUMENTS

| | | | | |
|---|---|---|---|---|
| 6,311,004 B1 | * | 10/2001 | Kenney et al. ............. | 385/130 |
| 6,483,965 B1 | * | 11/2002 | Napier et al. .................. | 385/37 |
| 6,519,082 B2 | * | 2/2003 | Ghera et al. ............. | 359/341.4 |
| 6,594,428 B1 | * | 7/2003 | Tanaka et al. ............... | 385/123 |
| 6,604,872 B2 | * | 8/2003 | Puc et al. .................... | 398/158 |

FOREIGN PATENT DOCUMENTS

| EP | 1087551 A | 3/2001 |
|---|---|---|
| EP | 1087551 A2 | * 3/2001 ........... H04B/10/18 |
| WO | WO 01/25828 A2 | 4/2001 |

* cited by examiner

*Primary Examiner*—Akm Enayet Ullah
*Assistant Examiner*—Michelle R. Connelly-Cushwa (57) ABSTRACT

An optical pulse transmission line portion is provided, having dispersion slope compensation, including an optical waveguide (length $L_1$, dispersion parameter $D_1$) having a dispersion slope parameter ($S_1$) of a first sign, and a dispersion compensation unit (length $L_2$, dispersion parameter $D_2$) having a dispersion slope parameter ($S_2$) of the opposite sign. The path average dispersion (<D>) of the transmission line portion is:

$$\langle D \rangle = \frac{D_1 S_2 - D_2 S_1}{S_2 - S_1}$$

Further, an optical pulse transmission line element, having dispersion compensation and dispersion slope compensation are provided, including an optical waveguide (length $L_1$, dispersion parameter $D_1$, dispersion slope parameter $S_1$) and first and second dispersion compensation units (lengths $L_2$, $L_3$, dispersion parameters $D_2$, $D_3$, dispersion slope parameters $S_2$, $S_3$, respectively). The path average dispersion (<D>) of the transmission line element (total length L) is:

$$\langle D \rangle = \frac{D_2 S_3 - D_3 S_2}{S_3 - S_2}\left(1 - \frac{L_1}{L}\right) + \frac{L_1}{L} \frac{D_1(S_3 - S_2) + (D_2 - D_3)S_1}{S_3 - S_2}.$$

34 Claims, 7 Drawing Sheets

OPTICAL PULSE TRANSMISSION LINES

FIELD OF THE INVENTION

The invention relates to optical pulse transmission line parts which are particularly, but not exclusively, for use in high capacity, wavelength division multiplexed (WDM) optical waveguide transmission lines employing return-to-zero (RZ) optical pulses. The invention also relates to components for parts of an optical pulse transmission line, and to an optical pulse transmission line.

BACKGROUND TO THE INVENTION

At high bit rates optical communication systems suffer degradation of their transmission capacity. This is mainly due to the detrimental effects on the optical pulses of chromatic dispersion, fibre non-linearity and noise from optical amplifiers in the system.

In the transmission of soliton pulses, positive use is made of the fibre non-linearity by achieving a balance with the pulse broadening due to dispersion in the region of the anomalous chromatic dispersion. Conventional soliton transmission lines comprise optical fibre which has a constant, or slightly varying, dispersion coefficient. However, the distance over which soliton pulses may be transmitted along such a transmission line is limited by two contradicting requirements: the dispersion must be low in order to minimise Gordon-Haus timing jitter, which is driven by optical amplifier noise; and the dispersion must be high in order to suppress four-wave mixing in wavelength division multiplexed transmission systems. This contradiction is resolved by using a technique known as dispersion management in which the optical fibre transmission line has high local dispersion and low path-average dispersion.

One of the major factors limiting optical data transmission distance and capacity in WDM systems is the effect of dispersion slope, which is a wavelength dependent parameter. The dispersion slope of an optical waveguide causes a variation in the dispersion parameters of the waveguide as a result of a change in the wavelength of an optical signal propagating along the waveguide. That is to say, the dispersion experienced by an optical signal propagating along the waveguide is dependent upon the wavelength of the optical signal. Therefore each optical channel in a WDM system will experience a different dispersion parameter. As a result it is difficult to achieve system optimisation for all wavelength channels simultaneously.

Existing approaches to compensating for the effect of dispersion slope are rather complex. These include per channel dispersion slope compensation, the manufacture of pairs of optical fibres having opposite values of dispersion and dispersion slope, and the manufacture of compensating optical fibres capable of compensating for both the dispersion and dispersion slope of known transmission fibres, such as standard monomode fibre (SMF).

SUMMARY OF THE INVENTION

According to a first aspect of the present invention, there is provided an optical pulse transmission line portion having dispersion slope compensation, the transmission line portion comprising:

a first optical waveguide of a first length ($L_1$) having a first dispersion parameter ($D_1$) and a dispersion slope parameter ($S_1$) of a first sign, optically coupled to first dispersion slope compensating means of a second length ($L_2$) having a second dispersion parameter ($D_2$) and a dispersion slope parameter ($S_2$) of the opposite sign, wherein the path average dispersion slope of the transmission line portion is substantially zero and is given by $$<S> = S_1 L_1 + S_2 L_2$$

and the path average dispersion (<D>) of the transmission line portion is generally non zero, and is given by $$\langle D \rangle = \frac{D_1 S_2 - D_2 S_1}{S_2 - S_1}$$

The path average dispersion of the transmission line portion is preferably wavelength independent.

The optical pulse transmission line portion is preferably for inclusion in a wavelength division multiplexed optical pulse transmission system.

The optical pulse is desirably a return-to-zero optical pulse. The optical pulse is desirably an optical soliton. The optical pulse may alternatively be a chirped return-to-zero optical signal.

The first optical waveguide and the first dispersion slope compensating means are desirably arranged in a precompensating dispersion map configuration, or may alternatively be arranged in a postcompensating dispersion map configuration.

The transmission line portion preferably further comprises an optical amplifier. The optical amplifier may be optically coupled to the dispersion map at one end of the dispersion map or at a location along the dispersion map.

The transmission line portion may further comprise a second optical waveguide of a third length ($L_3$) having a first dispersion parameter ($D_1$) and a dispersion slope parameter ($S_1$) of a first sign and a second dispersion slope compensating means of a fourth length ($L_4$) having a second dispersion parameter ($D_2$) and a dispersion slope parameter ($S_2$) of the opposite sign.

The first and second optical waveguides and the first and second dispersion slope compensating means are desirably optically coupled together in a symmetric dispersion map configuration. The transmission line portion may further comprise a second optical amplifier. Desirably, one of the first and second optical amplifiers is provided at an end of the dispersion map and the other of the first and second optical amplifiers is provided towards the middle of the dispersion map.

The or each optical amplifier may be a fibre amplifier, such as an erbium doped fibre amplifier, or a fibre Raman amplifier. The or each optical amplifier may alternatively be a semiconductor optical amplifier device.

The first and second optical waveguides are preferably sections of a first optical fibre. The first optical fibre may be a transmission fibre such as standard monomode fibre, Lucent 2-wave fibre or Alcatel Terralight fibre.

The first and second dispersion slope compensating means preferably comprise sections of a third optical waveguide, which is most preferably a second optical fibre. The second optical fibre may be a compensating fibre, such as dispersion compensating fibre or reverse dispersion fibre.

The first and second dispersion slope compensating means may alternatively or additionally comprise sections of a fourth optical waveguide including an optical grating. The fourth optical waveguide is preferably a third optical fibre. The optical grating is preferably an optical fibre grating, such as a fibre Bragg grating.

According to a second aspect of the present invention, there is provided optical pulse transmission line portion components for incorporation into an existing terrestrial communication line which comprises a first optical waveguide of a first length ($L_1$) having a first dispersion parameter ($D_1$) and a dispersion slope parameter ($S_1$) of a first sign, the components comprising:

first dispersion slope compensating means of a second length ($L_2$) having a second dispersion parameter ($D_2$) and a dispersion slope parameter (S2) of the opposite sign, the first dispersion slope compensating means being connectable in optical communication with the first optical waveguide to form therewith an optical pulse transmission line portion having compensated dispersion slope, wherein the path average dispersion slope of the transmission line portion is substantially zero and is given by $$<S> = S_1 L_1 + S_2 L_2$$

and the path average dispersion (<D>) of the transmission line portion is generally non zero, and is given by $$\langle D \rangle = \frac{D_1 S_2 - D_2 S_1}{S_2 - S_1}$$

The path average dispersion of the transmission line portion is preferably wavelength independent.

The optical pulse transmission line portion preferably forms part of a wavelength division multiplexed optical pulse transmission system.

The optical pulse is desirably a return-to-zero optical pulse. The optical pulse is desirably an optical soliton. The optical pulse may alternatively be a chirped return-to-zero signal.

Desirably the first optical waveguide and the first dispersion slope compensating means, when connected together, form a precompensating dispersion map, or may alternatively form a postcompensating dispersion map.

The transmission line portion components preferably further comprise a first optical amplifier, being connectable in optical communication with the optical pulse transmission line portion. The first optical amplifier may be connected in optical communication with the transmission line portion at one end of the dispersion map or at a location along the dispersion map.

The existing terrestrial communication line may further comprise a second optical waveguide of a third length ($L_3$) having a first dispersion parameter ($D_1$) and a dispersion slope parameter ($S_1$) of a first sign.

The first and second optical waveguides are preferably sections of a first optical fibre. The first optical fibre may be a transmission fibre such as standard monomode fibre, Lucent 2-wave fibre or Alcatel Terralight fibre.

The transmission line portion components may further comprise a second dispersion slope compensating means of a fourth length (4) having a second dispersion parameter ($D_2$) and a dispersion slope parameter ($S_2$) of the opposite sign, and being connectable in optical communication with one or more of the aforementioned components, and the first and second optical waveguides.

Desirably, the first and second optical waveguides and the first and second dispersion slope compensating means, when optically coupled together, form a symmetric dispersion map. The transmission line portion components may further comprise a second optical amplifier connectable in optical communication with one or more of the aforementioned components, and the first and second optical waveguides.

Desirably, one of the first and second optical amplifiers is provided at an end of the dispersion map and the other of the first and second optical amplifiers is provided towards the middle of the dispersion map.

The or each optical amplifier may be a fibre amplifier, such as an erbium doped fibre amplifier, or a fibre Raman amplifier. The or each optical amplifier may alternatively be a semiconductor optical amplifier device.

The first and second dispersion slope compensating means preferably comprise sections of a third optical waveguide, which is most preferably a second optical fibre. The second optical fibre may be a compensating fibre, such as dispersion compensating fibre or reverse dispersion fibre.

The first and second dispersion slope compensating means may alternatively or additionally comprise sections of a fourth optical waveguide including an optical grating. The fourth optical waveguide is preferably third optical fibre. The optical grating is preferably an optical fibre grating, such as a fibre Bragg grating.

According to a third aspect of the present invention there is provided an optical pulse transmission line having dispersion slope compensation, the optical pulse transmission line comprising a plurality of optical pulse transmission line portions, according to any of paragraphs 6 to 17 above, connected in optical communication in series.

The optical pulse transmission line is preferably for inclusion in a wavelength division multiplexed optical pulse transmission system.

The optical pulse is desirably a return-to-zero optical pulse. The optical pulse is desirably an optical soliton. The optical pulse may alternatively be a chirped return-to-zero signal.

According to a fourth aspect of the present invention there is provided an optical pulse transmission line element having dispersion compensation and dispersion slope compensation, the transmission line element comprising:

a first optical waveguide of a first length ($L_1$) having a first dispersion parameter ($D_1$) and a first dispersion slope parameter ($S_1$), first dispersion slope compensating means of a second length ($L_2$) having a second dispersion parameter ($D_2$) and a second dispersion slope parameter ($S_2$), and second dispersion slope compensating means of a third length ($L_3$) having a third dispersion parameter ($D_3$) and a third dispersion slope parameter ($S_3$), the first optical waveguide, the first dispersion slope compensating means and the second dispersion slope compensating means being connected together in optical communication to form the transmission line element, wherein the path average dispersion slope of the transmission line element is substantially zero and is given by $$<S> = S_1 L_1 + S_2 L_2 + S_3 L_3$$

and the path average dispersion (<D>) of the transmission line element, having a total length $L = L_1 + L_2 + L_3$ is given by $$\langle D \rangle = \frac{D_2 S_3 - D_3 S_2}{S_3 - S_2}\left(1 - \frac{L_1}{L}\right) + \frac{L_1}{L} \frac{D_1(S_3 - S_2) + (D_2 - D_3)S_1}{S_3 - S_2}.$$

The path average dispersion of the transmission line element is preferably wavelength independent.

Preferably, $+/-[D_1(S_3-S_2)+(D_2-D_3)S_1]+/-(S_3-S2)$ is greater whereby the path average dispersion may be controlled by selection of the length ($L_1$) of the first optical waveguide. The path average dispersion of the transmission line element is desirably substantially zero. The path average dispersion of the transmission line element may alternatively be non-zero.

The optical pulse transmission line element is preferably for inclusion in a wavelength division multiplexed optical pulse transmission system.

The optical pulse is desirably a return-to-zero optical pulse. The optical pulse is desirably an optical soliton. The optical pulse may alternatively be a chirped return-to-zero signal.

The first optical waveguide is preferably a first optical fibre. The first optical fibre may be a transmission fibre, such as standard monomode fibre, Lucent 2-wave fibre or Alcatel Terralight fibre.

The first dispersion slope compensating means is preferably a second optical waveguide. The second optical waveguide is desirably a second optical fibre, which may be a compensating fibre such as reverse dispersion fibre or dispersion compensating fibre. The first dispersion slope compensating means may comprise two parts, each part comprising a section of the second optical fibre.

The second dispersion slope compensating means preferably comprise a third optical waveguide. The third optical waveguide is desirably a third optical fibre, which may be a compensating fibre such as dispersion compensating fibre or reverse dispersion fibre.

The second dispersion slope compensating means may alternatively or additionally comprise a fourth optical waveguide including an optical grating. The fourth optical waveguide is preferably a fourth optical fibre. The optical grating is preferably an optical fibre grating, such as a fibre Bragg grating.

The transmission line element desirably further comprises at least one optical amplifier.

Desirably, the transmission line element comprises a plurality of sections of the first optical waveguide.

A first section of the first optical waveguide and the first dispersion slope compensating means are preferably arranged to form an optical pulse transmission line portion according to the first aspect of the invention.

The transmission line element desirably comprises:
first and second sections of the first optical waveguide, first and second parts of the first dispersion slope compensating means and first and second optical amplifiers, all being arranged to form a first optical pulse transmission line portion according to the first aspect of the invention, having a symmetric dispersion map;
optically coupled in series to
a second optical pulse transmission line portion according to the first aspect of the invention comprising the second dispersion slope compensating means, a third section of the first optical waveguide, and a third optical amplifier.

The or each optical amplifier is preferably a fibre amplifier, such as an erbium doped fibre amplifier or a fibre Raman amplifier. The or each optical amplifier may alternatively be a semiconductor optical amplifier device.

Desirably, a plurality of first optical pulse transmission line portions according to the first aspect of the invention, having a symmetric dispersion map, are provided, connected together in series in optical communication.

The path average dispersion slope of the or each first optical pulse transmission line portion is desirably substantially zero. The path average dispersion of the or each first optical pulse transmission line portion is desirably non zero and of a first sign.

The path average dispersion slope of the second optical pulse transmission line portion is desirably substantially zero. The path average dispersion of the second optical pulse transmission line portion is desirably non zero and of the opposite sign.

The path average dispersion of the optical pulse transmission line element is preferably equal to the sum of the path average dispersion of the or each first optical pulse transmission line portion and the path average dispersion of the second optical pulse transmission line portion. The path average dispersion of the transmission line element is desirably substantially zero.

According to a fifth aspect of the present invention there are provided optical pulse transmission line element components for incorporation into an existing terrestrial communication line which comprises a first optical waveguide of a first length ($L_1$) having a first dispersion parameter ($D_1$) and a dispersion slope parameter ($S_1$) of a first sign, the components comprising:

first dispersion slope compensating means of a second length ($L_2$) having a second dispersion parameter ($D_2$) and a second dispersion slope parameter ($S_2$), and second dispersion slope compensating means of a third length ($L_3$) having a third dispersion parameter ($D_3$) and a third dispersion slope parameter ($S_3$), the first optical waveguide, the first dispersion slope compensating means and the second dispersion slope compensating means being connectable together in optical communication to thereby form a transmission line element, wherein the path average dispersion slope of the transmission line element is substantially zero and is given by $$<S> = S_1 L_1 + S_2 L_2 + S_3 L_3$$

and the path average dispersion (<D>) of the transmission line element, having a total length $L = L_1 + L_2 + L_3$ is given by $$\langle D \rangle = \frac{D_2 S_3 - D_3 S_2}{S_3 - S_2}\left(1 - \frac{L_1}{L}\right) + \frac{L_1}{L}\frac{D_1(S_3 - S_2) + (D_2 - D_3)S_1}{S_3 - S_2}.$$

The path average dispersion of the transmission line element is preferably wavelength independent.

Preferably, $+/-[D_1(S_3-S_2)+(D_2-D_3)S_1]+/-(S_3-S_2)$ is greater whereby the path average dispersion may be controlled by selection of the length ($L_1$) of the first optical waveguide. The path average dispersion of the transmission line element is desirably substantially zero.

The optical pulse transmission line element preferably forms part of a wavelength division multiplexed optical pulse transmission system.

The optical pulse is desirably a return-to-zero optical pulse. The optical pulse is desirably an optical soliton. The optical pulse may alternatively be a chirped return-to-zero signal.

The first optical waveguide is preferably a first optical fibre. The first optical fibre may be a transmission fibre, such as standard monomode fibre, Lucent 2-wave fibre or Alcatel Terralight fibre.

The first dispersion slope compensating means is preferably a second optical waveguide. The second optical waveguide is desirably a second optical fibre, which may be a compensating fibre such as reverse dispersion fibre or dispersion compensating fibre. The first dispersion slope compensating means may comprise two parts, each part comprising a section of the second optical fibre.

The second dispersion slope compensating means preferably comprises a third optical waveguide. The third optical waveguide may be a third optical fibre, which may be a compensating fibre, such as dispersion compensating fibre.

The second dispersion slope compensating means may alternatively or additionally comprise a fourth optical waveguide including an optical grating. The fourth optical waveguide is preferably a fourth optical fibre. The optical grating is preferably an optical fibre grating, such as a fibre Bragg grating.

The transmission line element components desirably further comprise at least one optical amplifier, connectable in optical communication with one or more of the above mentioned components and the first optical waveguide.

The existing terrestrial communication line may comprise a plurality of sections of the first optical waveguide.

The first dispersion slope compensating means is preferably connectable in optical communication to a first section of the first optical waveguide, to thereby form an optical pulse transmission line portion according to the first aspect of the invention.

The transmission line element components and the existing terrestrial communication line are desirably connectable together in optical communication to thereby form a transmission line element which comprises:

first and second sections of the first optical waveguide, first and second parts of the first dispersion slope compensating means, and first and second optical amplifiers, connected together in optical communication to thereby form a first optical pulse transmission line portion according to the first aspect of the invention, having a symmetric dispersion map;

optically coupled in series to a second optical pulse transmission line portion according to the first aspect of the invention comprising the second dispersion slope compensating means, a third section of the first optical waveguide, and a third optical amplifier connected together in optical communication.

The or each optical amplifier is preferably a fibre amplifier, such as an erbium doped fibre amplifier, or a fibre Raman amplifier. The or each optical amplifier may alternatively comprise a semiconductor amplifier device.

Desirably, the transmission line element components and the existing terrestrial communication line are connectable together in optical communication to thereby form a plurality of first optical pulse transmission line portions according to the first aspect of the invention, each having a symmetric dispersion map.

The path average dispersion slope of the or each first optical pulse transmission line portion is desirably substantially zero. The path average dispersion of the or each first optical pulse transmission line portion is desirably non zero and of a first sign.

The path average dispersion slope of the second optical pulse transmission line portion is desirably substantially zero. The path average dispersion of the second optical pulse transmission line portion is desirably non zero and of the opposite sign.

The path average dispersion of the optical pulse transmission line element is preferably equal to the sum of the path average dispersion of the or each first optical pulse transmission line portion and the path average dispersion of the second optical pulse transmission line portion. The path average dispersion of the transmission line element is desirably substantially zero.

According to a sixth aspect of the invention there is provided an optical pulse transmission line having dispersion compensation and dispersion slope compensation, the transmission line comprising a plurality of transmission line elements according to any of paragraphs 32 to 49 above connected together in optical communication in series.

The optical pulse transmission line is preferably for inclusion in a wavelength division multiplexed optical pulse transmission system.

The optical pulse is desirably a return-to-zero optical pulse. The optical pulse is desirably an optical soliton. The optical pulse may alternatively be a chirped return-to-zero signal.

According to a further aspect of the present invention there is provided a method of manufacturing a pair of optical waveguides for inclusion in an optical pulse transmission line portion according to the first aspect of the present invention, the method including the steps of:

selecting the desired average dispersion (<D>) of the transmission line portion; and then selecting the dispersion parameter ($D_1$) of the first waveguide of the pair, the dispersion slope parameter ($S_1$) of the first waveguide, the dispersion parameter ($D_2$) of the second waveguide of the pair, and the dispersion slope parameter ($S_2$) of the second waveguide, such that the following relationship is satisfied $$\langle D \rangle = \frac{D_1 S_2 - D_2 S_1}{S_2 - S_1}$$

Preferably, each optical waveguide comprises an optical fibre. Each optical waveguide may alternatively comprise a semiconductor waveguide.

The average dispersion of the transmission line portion may be anomalous, zero or normal. The average dispersion is preferably small, typically less than 1 picosecond/nanometer/kilometer.

BRIEF DESCRIPTION OF THE DRAWINGS

Examples of the present invention will now be described in detail with reference to the accompanying drawings, in which.

DETAILED DESCRIPTION

Referring to FIGS. 1 to 4, the present invention provides an optical pulse transmission line portion 10, 20, 30, 40 having dispersion slope compensation.

Figures 1, 2, 3:
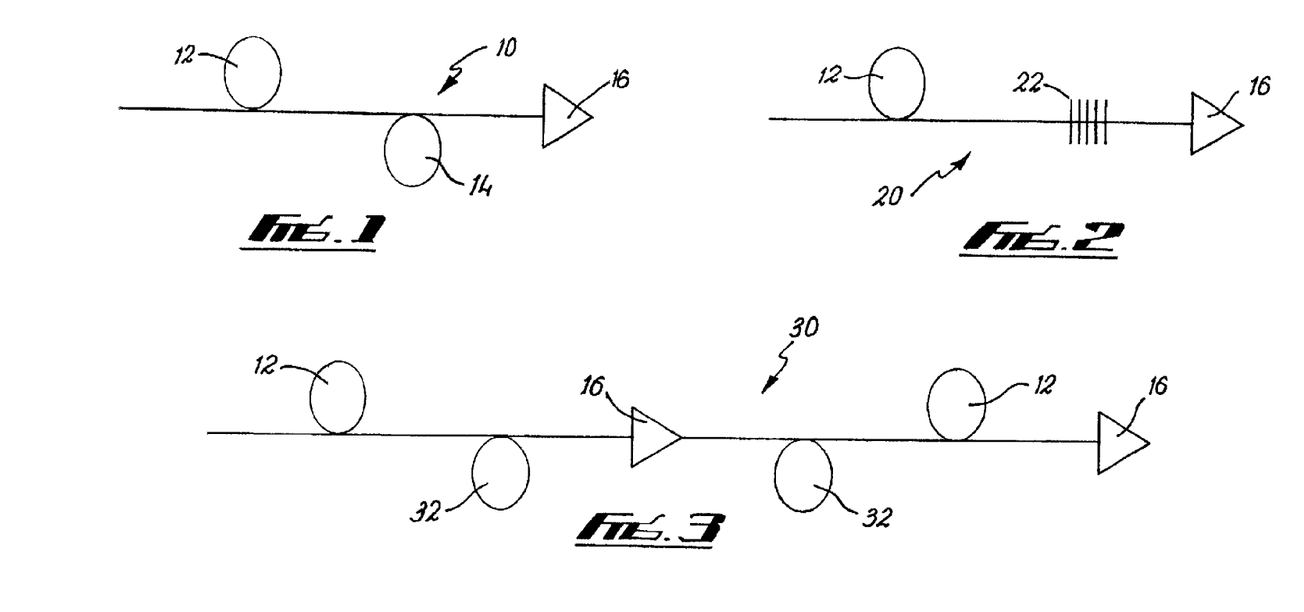
FIG. 1 is a diagrammatic representation of an optical pulse transmission line portion according to a first aspect of the invention.
FIG. 2 is a diagrammatic representation of an alternative optical pulse transmission line portion according to the first aspect of the invention.
FIG. 3 is a diagrammatic representation of a further alternative optical pulse transmission line portion according to the first aspect of the invention.

The transmission line portion 10 shown in FIG. 1 comprises a first optical waveguide in the form of a section of standard monomode fibre (SMF) 12 optically coupled to first dispersion slope compensating means in the form of a section of reverse dispersion fibre (RDF) 14. In this example, the transmission line portion 10 further comprises an optical amplifier in the form of an erbium doped fibre amplifier (EDFA) 16 optically coupled to the other end of the RDF 14.

The SMF 12 has a dispersion parameter ($D_1$) of 16.2 ps/nm/km at a wavelength of 1550 nm, and a dispersion slope parameter ($S_1$) of +0.057 ps/nm/nm/km. The RDF 14 has a dispersion ($D_2$) of −15.36 ps/nm/km at a wavelength of 1550 nm and a dispersion slope ($S_2$) of −0.053 ps/nm/nm/km.

The length (L) of the transmission line portion 10 is equal to the sum of the lengths of the SMF 12 ($L_1$) and the RDF 14 ($L_2$), in other words $$L = L_1 + L_2 \qquad \text{Equation 1}$$

The path average dispersion slope of the transmission line portion 10 is required to be substantially zero, and is given by the equation $$S_1 L_1 + S_2 L_2 = 0 \qquad \text{Equation 2}$$

The path average dispersion of the transmission line portion 10 is generally non-zero, and is given by $$\langle D \rangle = \frac{D_1 L_1 + D_2 L_2}{L} \qquad \text{Equation 3}$$

The path average dispersion of the transmission line portion may be determined in terms of the dispersion parameter and dispersion slope parameter of the first optical waveguide, being the SMF 12, and the first dispersion slope compensating means, namely the RDF 14, as follows:

The length ($L_2$) of the RDF 14 can be expressed through the total length (L) of the transmission line portion 10 and the length ($L_1$) of the SMF 12, by re-arranging equation 1, as follows $$L_2 = L - L_1 \qquad \text{Equation 1a}$$

This equation may be used to replace $L_2$ in equation 2, and equation 2 then re-arranged to obtain an expression for the length, $L_1$, of the SMF 12, as follows $$L_1 = \frac{S_2 L}{S_2 - S_1} \qquad \text{Equation 4}$$

We then replace the term $L_2$ in equation 3 with equation 1a, to give the following $$\langle D \rangle = \frac{D_1 L_1 + D_2 (L - L_1)}{L} \qquad \text{Equation 3a}$$

and then replace each term $L_1$ in equation 3a with equation 4, as follows $$\langle D \rangle = D_1 \frac{S_2}{S_2 - S_1} + D_2 \left(1 - \frac{S_2}{S_2 - S_1}\right) \qquad \text{Equation 3b}$$

which may then be re-arranged to give an expression for the path average dispersion in terms of the dispersion parameters $D_1$ and $D_2$ and the dispersion slope parameters $S_1$ and $S_2$, as follows $$\langle D \rangle = \frac{D_1 S_2 - D_2 S_1}{S_2 - S_1} \qquad \text{Equation 3c}$$

It can be seen from equation 3c that the average dispersion does not depend on the wavelength of an optical signal propagating along the transmission line portion 10. The average dispersion is therefore the same for all channels in a WDM system.

By inserting the dispersion parameters and the dispersion slope parameters of the SMF 12 and the RDF 14 into equation 3c we can then obtain the path average dispersion of the transmission line portion 10 as being −0.16 ps/nm/km. By inserting the dispersion slope parameters of the SMF 12 and RDF 14 into equation 4 we can obtain an expression, as follows, for the length ($L_1$) of the SMF 12, in terms of the total length (L) of the transmission line portion 10, required in order to make the transmission line portion 10 have a path average dispersion slope of substantially zero:

$$L_1 = 0.48 L$$

The transmission line portion 20 shown in FIG. 2 is of similar construction to that shown in FIG. 1, with the following modifications. The same reference numerals are retained for corresponding features.

In this example, the first dispersion slope compensating means takes the form of a fibre optic grating 22. The structure and the methods of fabricating a fibre optic grating will be well known to the skilled man and will not be gone into in any detail here. The skilled man will also understand that many different fibre optic gratings may be suitable for use, and that they may be fabricated to have a desired dispersion parameter and dispersion slope parameter. One example of a suitable fibre optic grating is a fibre Bragg grating.

The above equations, and in particular equations 2 and 3c, may be applied to the transmission line portion 20 shown in FIG. 2. The path average dispersion slope of the transmission line portion 20 may then be set to zero, or close to zero. The path average dispersion of the transmission line portion 20 may be calculated by inserting the dispersion and dispersion slope parameters of the SMF 12 and the fibre optic grating 22 into equation 3c, as described above.

The transmission line portion 30 shown in FIG. 3 comprises, from left to right across the page i.e. in the direction of propagation of an optical pulse, a first optical waveguide in the form of a section of SMF 12, optically coupled to first dispersion slope compensating means in the form of a first section of dispersion compensating fibre (DCF) 32, optically coupled to a first optical amplifier in the form of an EDFA 16, optically coupled to a second dispersion slope compensating means in the form of a second section of DCF 32, followed by a second optical waveguide in the form of a second section of SMF, optically coupled to a second EDFA 16. The first and second sections of SMF 12 and the first and second sections of DCF 32 are arranged in a symmetric dispersion map configuration.

The DCF 32 has a dispersion parameter of −83.1 ps/nm/km and a dispersion slope parameter of −0.3 ps/nm/nm/km. The path average dispersion of the transmission line portion 30 may be calculated by inserting the dispersion parameter and dispersion slope parameter of the SMF 12 and the DCF 32 into equation 3c. This gives the path average dispersion of the transmission line portion 30 as being 0.35 ps/nm/km. The length of the SMF 12 required to obtain dispersion slope compensation across the transmission line portion 30, may be determined in terms of the total length of the transmission line portion 30 by inserting the dispersion slope parameter of the SMF 12 and the DCF 32 into equation 4, to give $$L_1 = 0.84L$$

Figure 4:
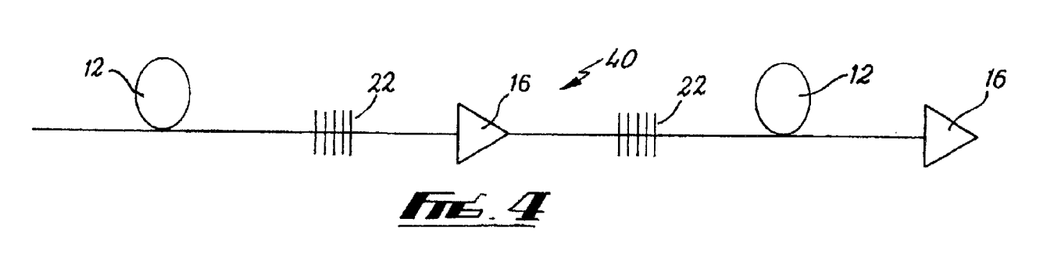
FIG. 4 is a diagrammatic representation of a further alternative optical pulse transmission line portion according to the first aspect of the invention.

The transmission line portion 40 shown in FIG. 4 is substantially the same as that shown in FIG. 3, but in this example the first and second dispersion slope compensating means take the form of fibre optic gratings 22. The same reference numerals are retained for corresponding features.

Equations 2, 3c and 4 may similarly be applied to this transmission line portion 40, to calculate the path average dispersion and $L_1$ as a function of $L$.

Figure 5:
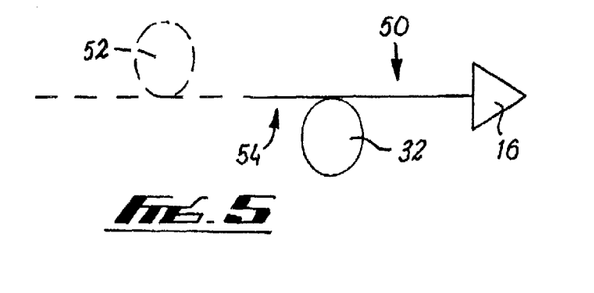
FIG. 5 is a diagrammatic representation of optical pulse transmission line portion components according to a second aspect of the invention.
Figure 6:
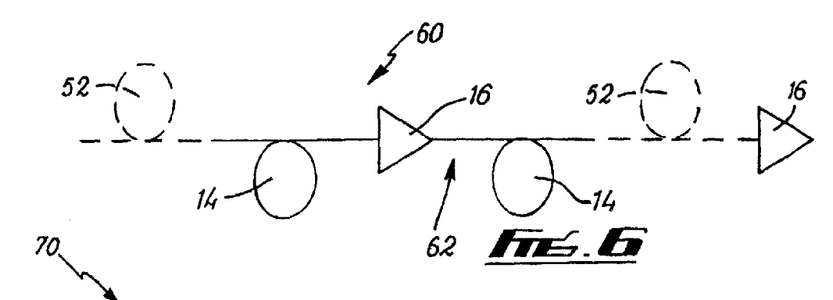
FIG. 6 is a diagrammatic representation of alternative optical pulse transmission line portion components according to the second aspect of the invention.

A second aspect of the invention provides optical pulse transmission line portion components 50, 60, as shown in FIGS. 5 and 6. The components 50, 60 are for incorporation into an existing terrestrial communication line. This is desirable in order to allow upgrade of existing communication lines. The existing terrestrial communication line comprises a section of the first optical waveguide, which in this example takes the form of SMF 52. SMF is chosen for this example because many existing optical telecommunications lines comprise at least some sections of this type of optical fibre.

In the example shown in FIG. 5, the components comprise first dispersion slope compensating means in the form of DCF 32 and an optical amplifier in the form of an EDFA 16. The DCF 32 is connectable in optical communication with the existing SMF 52, to form therewith an optical pulse transmission line portion 54 having compensated dispersion slope.

The completed transmission line portion 54 has a path average dispersion slope of substantially zero, given by equation 2. The path average dispersion of the completed transmission line portion 54 may be calculated using equation 3c.

The transmission line portion components 60 shown in FIG. 6 comprise first and second dispersion slope compensating means in the form of sections of RDF 14, and first and second optical amplifiers in the form of EDFAs 16. In this example, the existing terrestrial communication line comprises first and second optical waveguides, in the form of sections of SMF 52. The first EDFA 16 is connected to the first and second sections of RDF 14, being provided in between the two sections of RDF 14. These optical components are then connectable, at the free end of each section of RDF, to the first and second sections of SMF 52 respectively to thereby form an optical pulse transmission line portion having a symmetric dispersion map. The second EDFA 16 is connectable to the other end of the second section of SMF 52.

As above, the path average dispersion slope of the completed transmission line portion 62 is substantially zero. The path average dispersion of the completed transmission line portion 62 may be determined using equation 3c.

Figure 7:
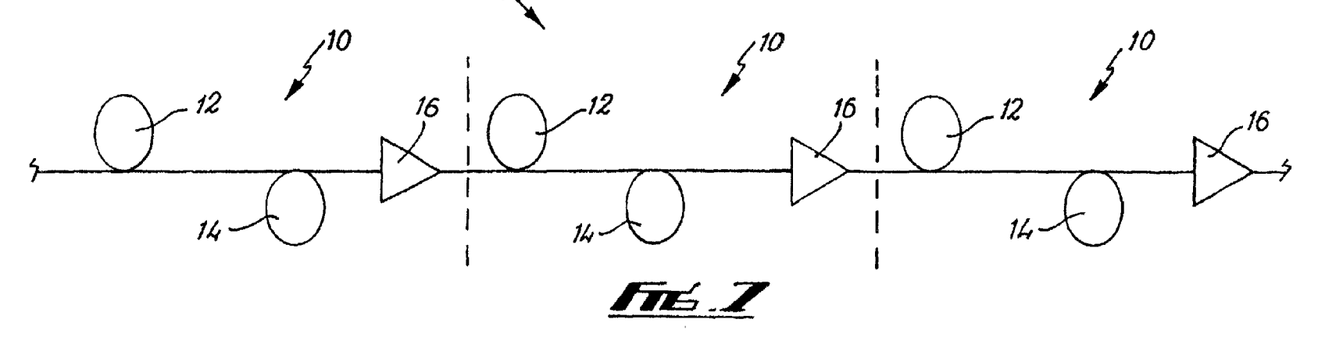
FIG. 7 is a diagrammatic representation of an optical pulse transmission line having dispersion slope compensation according to a third aspect of the invention.

FIG. 7 shows an optical pulse transmission line 70 having dispersion slope compensation. The transmission line 70 comprises a plurality of, in this example three, optical pulse transmission line portions 10 as shown in FIG. 1, connected together in optical communication in series. The same reference numerals are retained for corresponding features.

The path average dispersion slope of the transmission line 70 is substantially zero, due to each transmission line portion 10 having a path average dispersion slope substantially equal to zero. The path average dispersion of the transmission line 70 is equal to the path average dispersion of a single transmission line portion 10 multiplied by the number of transmission line portions 10 present. The path average dispersion of the transmission line 70 is therefore −0.48 ps/nm/km.

It will be appreciated by the skilled man that the transmission line 70 can comprise more than three transmission line portions 10. In addition, it will be appreciated that one or more of the transmission line portions 10 may be replaced by one or more transmission line portions 20, 30, 40 as shown in FIGS. 2, 3 and 4.

Referring now to FIGS. 8 to 11, a further aspect of the present invention provides an optical pulse transmission line element 80, 90, 100, 110 having both dispersion compensation and dispersion slope compensation.

Figure 8:
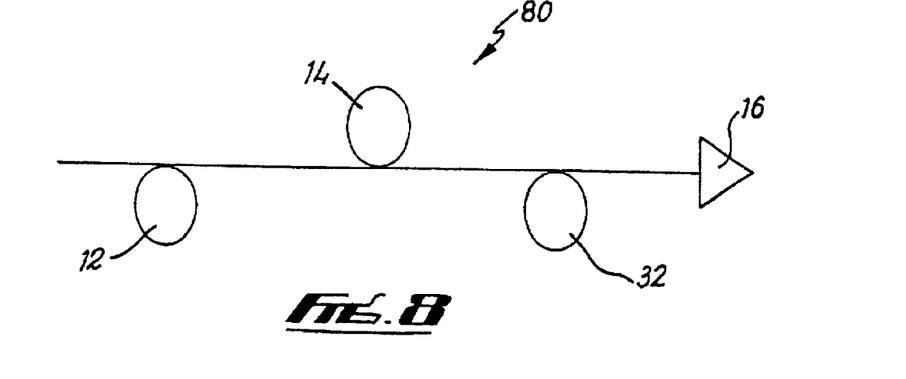
FIG. 8 is a diagrammatic representation of an optical pulse transmission line element according to a fourth aspect of the invention.

The transmission line element 80 shown in FIG. 8 comprises a first optical waveguide in the form of a section of SMF 12 optically coupled to first dispersion slope compensating means in the form of a section of RDF 14. Second dispersion compensating means, being a section of DCF 32 in this example, is optically coupled to the other end of the RDF 14. In this example, the transmission line element also includes an optical amplifier in the form of an EDFA 16, being optically coupled to the other end of the DCF 32.

The length (L) of the transmission line element 80 is equal to the sum of the lengths of the SMF 12 ($L_1$), the RDF 14 ($L_2$) and the DCF 32 ($L_3$), in other words $$L = L_1 + L_2 + L_3 \qquad \text{Equation 5}$$

The path average dispersion slope of the transmission line element 80 is required to be substantially zero, and is given by the equation $$S_1 L_1 + S_2 L_2 + S_3 L_3 = 0 \qquad \text{Equation 6}$$

The path average dispersion of the transmission line element 80 is given by $$\langle D \rangle = \frac{D_1 L_1 + D_2 L_2 + D_3 L_3}{L} \qquad \text{Equation 7}$$

The path average dispersion of the transmission line element 80 may be determined in terms of the dispersion and dispersion slope parameters of the first optical waveguide and the first and second dispersion slope compensating means, in this example the three fibres 12, 14, 32, the length (L) of the transmission line element 80 and the length ($L_1$) of the first fibre, as follows:

The length ($L_2$) of the second fibre, RDF 14 in this example, can be expressed in terms of the total length (L) of the transmission line element 80 and the length ($L_1$) of the first fibre by firstly rearranging equation 5 to give $$L_3 = L - L_1 - L_2 \quad \text{Equation 5a}$$

The term $L_3$ in equation 6 is then replaced by equation 5a, to give $$S_1 L_1 + S_2 L_2 + S_3 (L - L_1 - L_2) = 0 \quad \text{Equation 6a}$$

which can then be rearranged to give $$L_2 = \frac{S_1 L_1 + S_3 (L - L_1)}{S_3 - S_2} \quad \text{Equation 8}$$

Next, the terms $L_2$ and $L_3$ in equation 7 are replace by equations 8 and 5a respectively, to give $$\langle D \rangle = \frac{D_1 L_1}{L} + \frac{D_2}{L} \frac{S_1 L_1 + S_3 (L - L_1)}{S_3 - S_2} + \frac{D_3}{L}(L - L_1 - L_2) \quad \text{Equation 7a}$$

which may then be rearranged to give the final expression for the path averaged dispersion of the transmission line element 80, as $$\langle D \rangle = \quad \text{Equation 7b}$$

$$\frac{D_2 S_3 - D_3 S_2}{S_3 - S_2}\left(1 - \frac{L_1}{L}\right) + \frac{L_1}{L} \frac{D_1 (S_3 - S_2) + (D_2 - D_3) S_1}{S_3 - S_2}$$

It can be seen from equation 7b that under the condition $$+/-[D_1(S_3 - S_2) + (D_2 - D_3)S_1] +/- (S_3 - S_2) > 0$$

the average dispersion of the transmission line element may be controlled by selecting the length of $L_1$. The use of the + or − signs in the above equation is dependent upon the signs of $D_1$ and $D_2$. This allows transmission line elements having substantially zero dispersion and substantially zero dispersion slope to be constructed.

Such transmission line elements are of great interest in relation to WDM transmission systems. As was the case for the transmission line portion according to the first aspect of the invention, shown in FIGS. 1 to 4, it can be seen from equation 7b that the average dispersion does not depend on the wavelength of an optical signal propagating along the transmission line element 80. The average dispersion will therefore be the same for all channels in a WDM system.

By inserting the required parameters into equation 7b we can obtain the path average dispersion of the transmission line element 80 as being $$\langle D \rangle = -0.82\left(1 - \frac{L_1}{L}\right) + 0.57\frac{L_1}{L}$$

Figure 9:
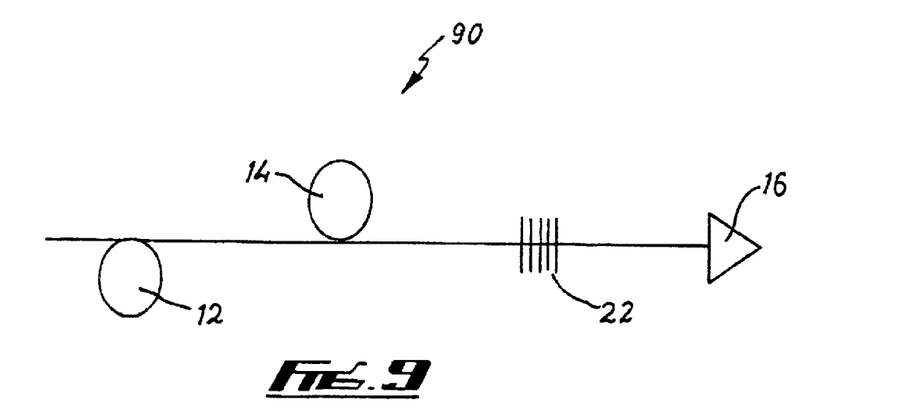
FIG. 9 is a diagrammatic representation of an alternative optical pulse transmission line element according to the fourth aspect of the invention.

The transmission line element 90 shown in FIG. 9 is of similar construction to the one shown in FIG. 8, with the following modifications. The same reference numerals are retained for corresponding features. In this example, the second dispersion slope compensating means comprises a fibre optic grating 22, such as a fibre Bragg grating.

Equations 7 to 8 above, and particularly equations 7b and 8, may similarly be applied to this transmission line element 90 in order to determine the path average dispersion. In addition, these equations may be applied during the fabrication of the grating 22 in order to determine the required dispersion and dispersion slope parameters of the grating.

Figure 10:
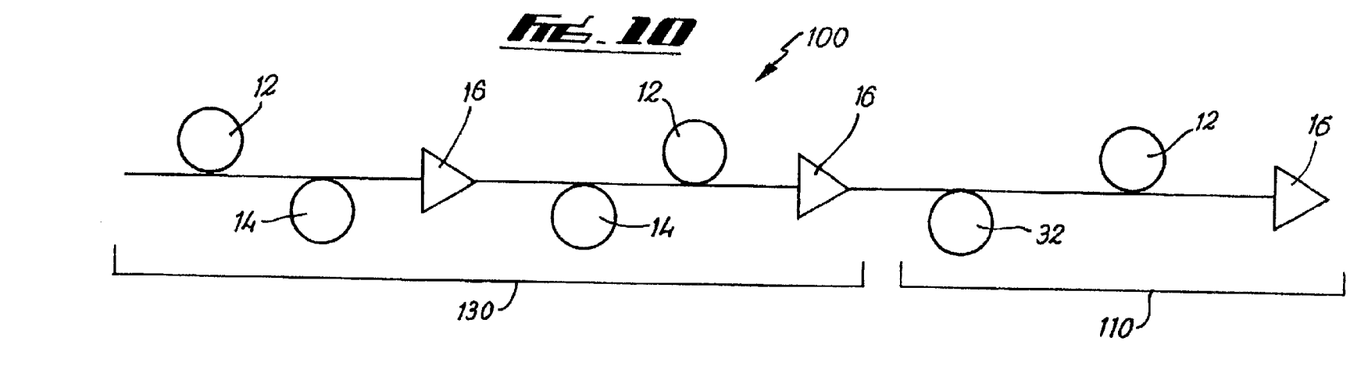
FIG. 10 is a diagrammatic representation of a further alternative optical pulse transmission line element according to the fourth aspect of the invention.

The transmission line element 100 shown in FIG. 10 comprises two transmission line portions 130, 110, according to the first aspect of the invention, optically coupled together in series. The transmission line portion 110 is similar to the transmission line portion 10 of FIG. 1, with the following modifications. The first dispersion slope compensating means comprises a section of DCF 32. The DCF 32 and the SMF 12 are arranged in a pre-compensating dispersion map configuration, in which the DCF 32 precedes the SMF 12.

The transmission line portion 130 is similar to the transmission line portion 30 of FIG. 3, with the following modification. The first dispersion slope compensating means comprises two sections of RDF 14.

In this example, the sections of RDF 14 and of SMF 12 are each of the same length, which we will call $L_1$. The sections of DCF 32 and SMF 12 in the other transmission line portion 110 are of different lengths, which we will call $L_2$ and $L_3$ respectively.

The dispersion and dispersion slope parameters of the three fibres are as follows: dispersion RDF ($D_{RDF}$)=−20 ps/nm/km; dispersion slope RDF ($S_{RDF}$) −0.06 ps/nm/nm/km; dispersion DCF ($D_{DCF}$) −83.1 ps/nm/km; dispersion slope DCF ($S_{DCF}$)=−0.3 ps/nm/nm/km; dispersion SMF ($D_{SMF}$) 18 ps/nm/km; and dispersion slope SMF ($S_{SMF}$)= 0.06 ps/nm/nm/km.

The path average dispersion slope of the first transmission line portion 130 is, applying equation 2, $$S_{SMF} 2L_1 + S_{RDF} 2L_1 = 0$$

The accumulated dispersion of the first transmission line portion 130 is $$D_{SMF} L_1 + D_{RDF} L_1 + D_{RDF} L_1 + D_{SMF} L_1 = -4L_1 \, ps/nm$$

The path average dispersion slope of the second transmission line portion 110 is $$S_{DCF} L_2 + S_{SMF} L_3 = 0$$

The total dispersion of the second transmission line portion 110 is $$D_{DCF} L_2 + D_{SMF} L_3 = -83.1 \, ps/nm/km \, (L_2) + 18 \, ps/nm/km \, (L_3)$$

if we select the length $L_3$ of the SMF to be equal to five times the length $L_2$ of the DCF, then the total dispersion is $6.9 L_2$ ps/nm.

The path average dispersion slope of the transmission line element 100 is equal to the sum of the path average dispersion slopes of the first transmission line portion 130 and the second transmission line portion 110. The path average dispersion slope of each portion 110 and 130 is substantially zero, hence the path average dispersion slope of the transmission line element is substantially zero.

The path average dispersion of the transmission line element 100 is equal to the sum of the dispersions of the first transmission line portion 130 and the second transmission line portion 110, as follows $$\langle D \rangle = -4L_1 + 6.9 L_2$$

We can then construct the transmission line element 100 to have substantially zero average dispersion by selecting the lengths $L_1$ and $L_2$ so that $$-4L_1 + 6.9 L_2 = 0$$

this can be rearranged to give $$L_2 = \frac{4L_1}{6.9} = 0.58L_1$$

i.e. for the above detailed fibres, the transmission line element 100 will have both substantially zero average dispersion and substantially zero average dispersion slope when the length of the DCF 32 ($L_2$) is equal to 0.58 times the length ($L_1$) of the fibres in the first transmission line portion 130.

Figure 11:
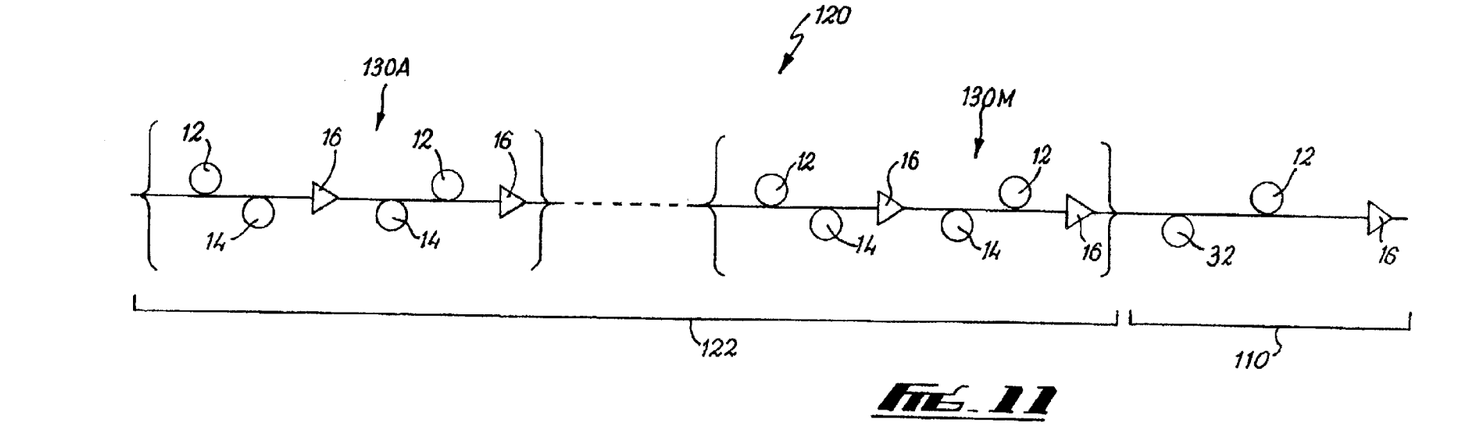
FIG. 11 is a diagrammatic representation of a further alternative optical pulse transmission line element according to the fourth aspect of the invention.

The transmission line element 120 shown in FIG. 11 is similar to the transmission line element 100 of FIG. 10, with the following modification. In this example, the first transmission line portion 122 comprises a plurality M of transmission line portions 130, as shown in FIG. 10, optically coupled in series. Only the first (A) and last (M) portions 130 are shown for clarity.

The total dispersion of the first transmission line portion 122 is equal to M times the accumulated dispersion of a single transmission line portion 130, and is therefore $-4M L_1$ ps/nm.

As above, we can construct the transmission line element 120, using the fibres detailed above, such that the transmission line element 120 will have both substantially zero average dispersion and substantially zero average dispersion slope. This is achieved when length of the DCF 32 ($L_2$) is equal to 0.58M times the length ($L_1$) of the fibres in the transmission line portions 130A–130M.

A further aspect of the invention provides optical pulse transmission line element components 140, 150, 160, 170, as shown in FIGS. 12 to 15. The components 140, 150, 160, 170 are for incorporation into an existing terrestrial communication line, in order to upgrade the communication line. The existing communication line comprises one or more sections of a first optical waveguide, in this example SMF 52.

Figure 12:
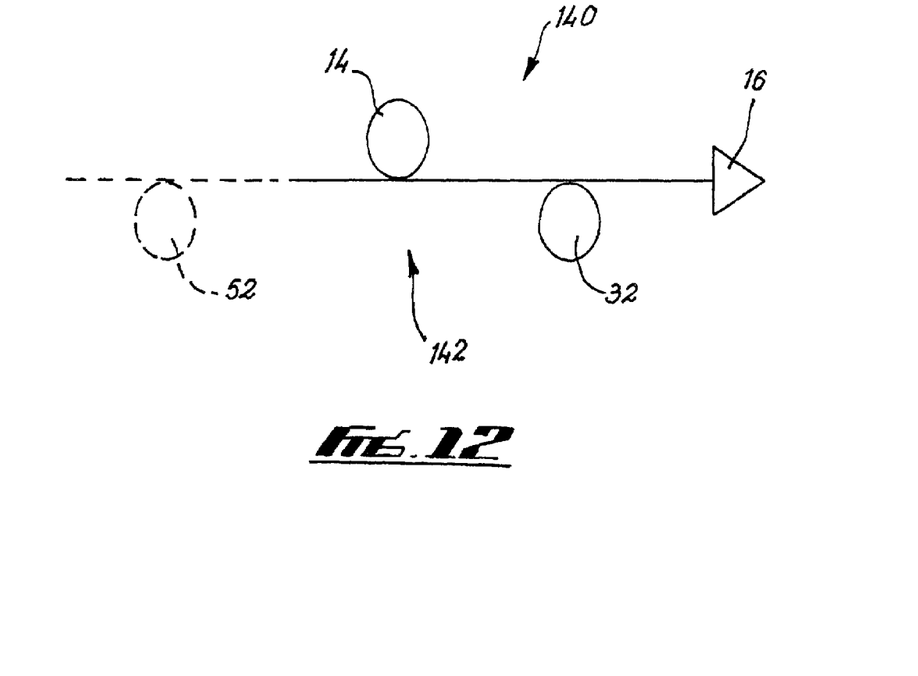
FIG. 12 is a diagrammatic representation of optical pulse transmission line element components according to a fifth aspect of the invention.

Referring to FIG. 12, the components comprise first dispersion slope compensating means in the form of RDF 14, optically coupled to second dispersion slope compensating means in the form of DCF 32. In this example the components further comprise an optical amplifier in the form of an EDFA 16, optically coupled to the other end of the DCF 32. The free end of the RDF 14 is connectable in optical communication with one end of the existing SMF 52, to form therewith and optical pulse transmission line element 142 having both dispersion compensation and dispersion slope compensation.

The completed transmission line element 142 is given substantially zero average dispersion and substantially zero average dispersion slope by appropriately selecting the length of each section of fibre, as discussed above in relation to FIGS. 8 to 11.

Figure 13:
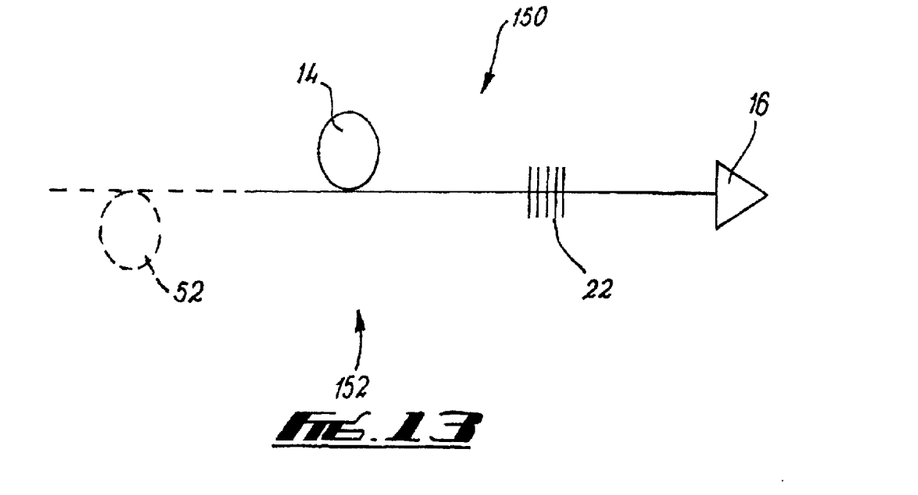
FIG. 13 is a diagrammatic representation of alternative optical pulse transmission line element components according to the fifth aspect of the invention.

The transmission line element components 150 shown in FIG. 13 are similar to those shown in FIG. 12, with the following modification. In this example, the second dispersion slope compensating means comprises an optical grating 22.

The completed transmission line 152 is constructed to have substantially zero average dispersion and substantially zero average dispersion slope by appropriately selecting the length of the SMF 52, the RDF 14 and the grating 22, and fabricating the grating 22 to have the desired dispersion parameter and dispersion slope parameter.

Figure 14:
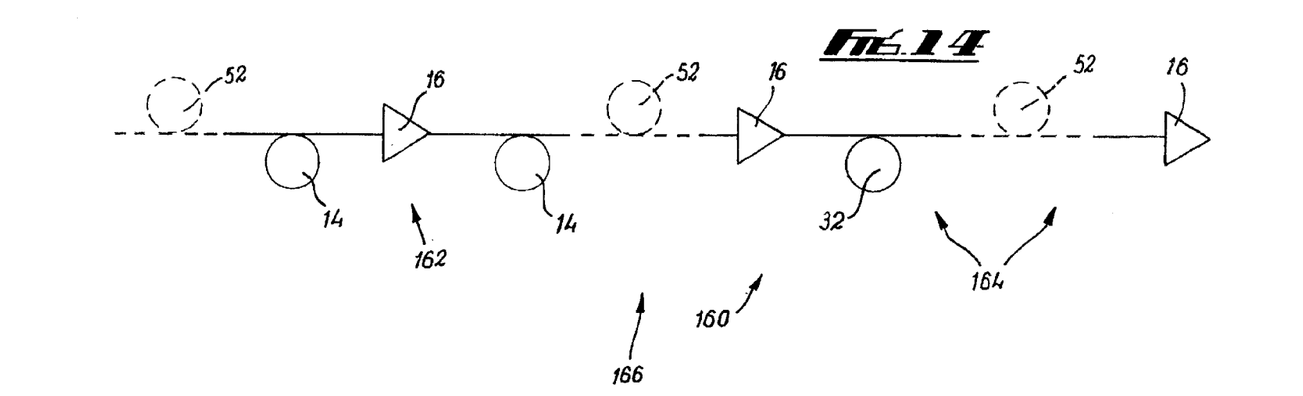
FIG. 14 is a diagrammatic representation of further alternative optical pulse transmission line element components according to the fifth aspect of the invention.

The transmission line element components 160 shown in FIG. 14 comprise, components 162 for a first transmission line portion according to the first aspect of the invention, as shown in FIG. 3, and components 164 for a second transmission line portion according to the first aspect of the invention, as shown in FIG. 1.

The first portion components 162 comprise, in this example two sections of RDF 14 and two EDFAs 16. The sections of RDF 14 are optically coupled together via one EDFA 16. The free end of each section of RDF 14 is connectable in optical communication with two existing sections of SMF 52. The other EDFA 16 is connectable in optical communication to the distal end of the second (moving left to right across the page, in the direction of propagation of an optical pulse) section of SMF 52.

The second portion components 164 comprise a section of DCF 32 optically coupled to the second EDFA 16 of the first portion components 162. The free end of the DCF is connectable in optical communication to one end of a third section of existing SMF 52. The second portion components 164 also include a third EDFA 16 which is connectable in optical communication with the other end of the third section of SMF 52.

The components 162, 164 are connectable to the existing sections of SMF 52, as described above, to form therewith an optical pulse transmission line element comprising two transmission line portions according to the first aspect of the invention. The completed transmission line element 166 having dispersion compensation and dispersion slope compensation.

As discussed above in relation to FIG. 10, the average dispersion of the completed transmission line element is equal to the sum of the dispersion of the two transmission line portions, and can be made to be substantially zero.

Figure 15:
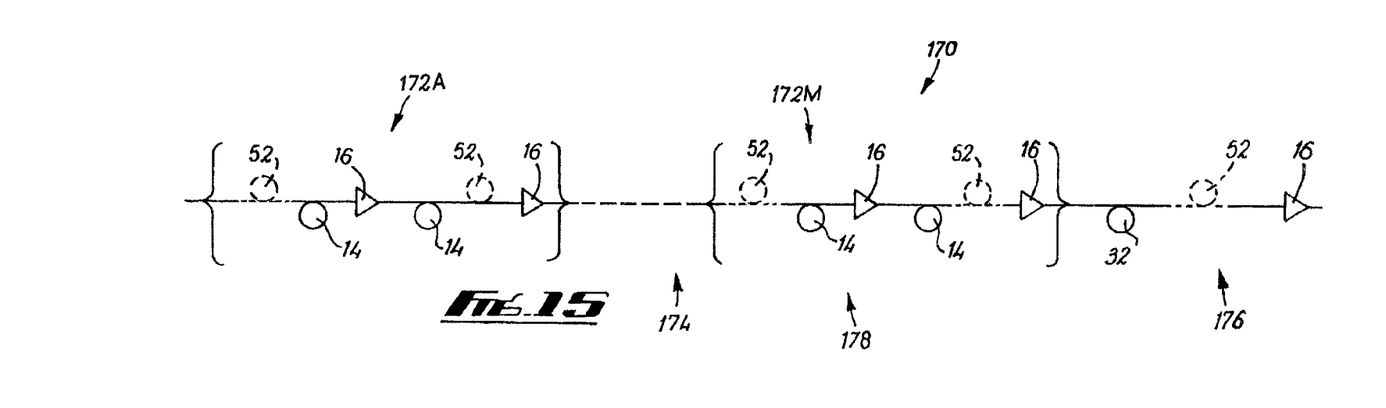
FIG. 15 is a diagrammatic representation of further alternative optical pulse transmission line element components according to the fifth aspect of the invention; and, FIG. 16 is a diagrammatic representation of an optical pulse transmission line having dispersion compensation and dispersion slope compensation according to a sixth aspect of the invention.

The transmission line element components 170 shown in FIG. 15 are similar to those shown in FIG. 14, with the following modification. The components comprise a plurality of sections of RDF 14 and EDFAs 16. The sections of RDF 14 and the EDFAs 16 being connected together and connectable to existing sections of SMF 52, as described above in relation to FIG. 14, in order to form therewith a plurality of transmission line portions 172A to 172M according to the first aspect of the invention.

The plurality of transmission line portions 172A to 172M together form a larger transmission line portion 174. The remaining components, being the DCF 32 and the last EDFA 16, and the final section of SMF 52 are connectable together to form a second transmission line portion 176 according to the first aspect of the invention. The larger transmission line portion 174 is optically coupled to the second transmission line portion 176 so that the portions together form a transmission line element 178 having dispersion compensation and dispersion slope compensation.

Figure 16:
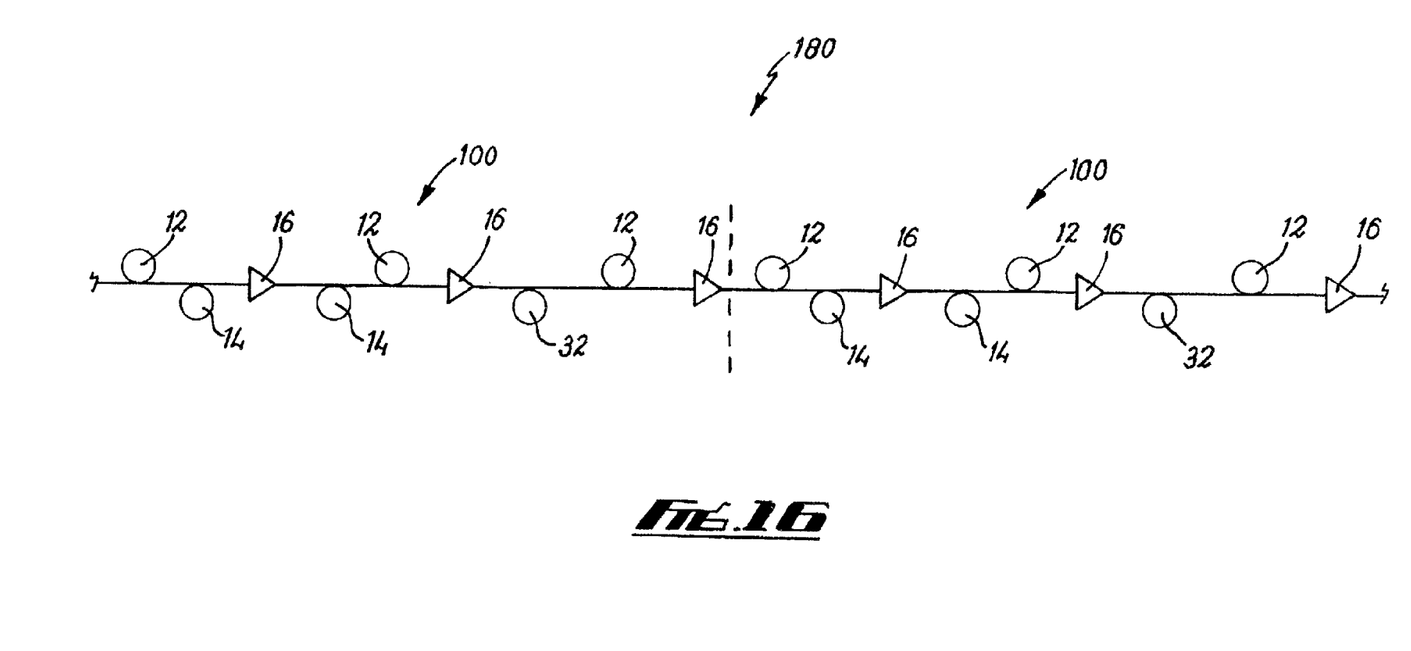

Referring to FIG. 16, a further aspect of the invention provides an optical pulse transmission line 180 having both dispersion compensation and dispersion slope compensation. The transmission line 180 comprises a plurality, in this case only two for clarity, of optical pulse transmission line elements 100, as shown in FIG. 10, connected together in optical communication in series. The same reference numerals are retained for corresponding features.

The path average dispersion slope of the transmission line 180 is substantially zero, due to each transmission line element 100 having a path average dispersion slope of substantially zero. The average dispersion of the transmission line 180 is substantially zero, due to each transmission line element 100 having an average dispersion of substantially zero.

The skilled man will appreciate that the transmission line 180 may comprise more than two transmission line elements 100. It will also be appreciated that one or more transmission line portions of the transmission line elements 100 may be replaced with transmission line portions of a different design. In particular, one or more of the first and second dispersion slope compensating means may alternatively or additionally comprise an optical fibre grating.

The typical current approach to implementing dispersion compensation is to manufacture pairs of optical fibres which simultaneously satisfy the requirement that both the path average dispersion and the path average dispersion slope are zero.

The present invention provides for dispersion slope compensation through the construction of an optical pulse transmission line, portion, or element from existing, commercially available fibres, rather than by using specially manufactured fibres. This is achieved in the case of the transmission line portion by selecting the length of one optical fibre, in terms of the total length of the transmission line portion and the dispersion slope parameters of the fibres to force the path average dispersion slope to be substantially zero. As a result, the path average dispersion of the transmission line portion is generally non-zero.

For the transmission line element this is achieved by selecting the length of one optical fibre in terms of the total length of the transmission line element, the length of a second optical fibre, and the dispersion and dispersion slope parameters of the fibres from which the transmission line element is constructed. By choosing the appropriate length of $L_1$ in equation 7b, the average dispersion of the transmission line element can be controlled. A transmission line element can thus be constructed which has both substantially zero average dispersion and substantially zero average dispersion slope. Such a transmission line element is obviously of great interest in relation to WDM systems because it will ensure that each optical channel in a WDM system will experience the same dispersion during propagation along the transmission line element.

It will be appreciated by the skilled man that the path average dispersion slope will ideally be zero in order to cancel out the differences in dispersion experienced by different wavelength channels in a WDM system. However, the skilled man will also appreciate that it is extremely difficult to achieve a path average dispersion slope of exactly zero in real life situations, a path average dispersion slope of substantially zero being an acceptable workable value.

Return-to-zero optical pulses can be transmitted along a dispersion-managed optical fibre transmission line having a range of path average dispersion values, including anomalous, zero and normal net dispersion. Optical pulses may therefore be transmitted along the optical pulse transmission line, portion or element according to the invention by adjusting the other carrier signal parameters, which are well known to the skilled man and so will not be gone into in detail here, but would typically include pulse peak optical power, pulse chirp, and dispersion map length, to make use of the resulting path average dispersion.

As the skilled man will be aware, optical pulse transmission systems employing dispersion-managed return-to-zero optical pulses are typically tolerant against small variations of the average dispersion of the transmission line. Therefore, the transmission line portions and elements according to the invention described above will be tolerant against variations in the average dispersion caused by variations in the dispersion parameters and dispersion slope parameters of the optical fibres from which they are constructed.

The skilled man will appreciate that the above discussed equations may also be applied during the manufacture of pairs of optical fibres to determine the required dispersion parameters and dispersion slope parameters to construct a transmission line portion having any required (typically small) average dispersion.

The present invention thus overcomes at least some of the current problems encountered by WDM transmission systems as a result of the dispersion slope parameters of the system fibres. Advantageously, this can be achieved employing existing commercially available optical fibres, rather than by manufacturing a fibre having special dispersion and dispersion slope characteristics. The invention provides a cost-effective optical pulse transmission line design which is advantageous for massive dispersion-managed WDM return-to-zero digital optical signal transmission.

The invention provides for simultaneous compensation of dispersion and dispersion slope in WDM transmission systems through the design of the transmission line, or parts of the transmission line.

Various modifications may be made without departing from the scope of the present invention. For example, different types of optical fibre or waveguide may be used in place of the DCF and RDF as dispersion slope compensating means. The SMF may also be replaced by an alternative transmission fibre, such as Lucent 2-wave fibre or Alcatel Terralight fibre. The transmission fibre may alternatively or additionally comprise one or more sections of compensating fibre. The optical fibres or waveguides may have different dispersion parameters and dispersion slope parameters to those described. Some or all of one or more optical waveguides may comprise a semiconductor waveguide rather than optical fibre.

A different type of optical amplifier may be used in place of the EDFAs described, such as a Raman amplifier. Also, a different type of optical amplifier may be required if semiconductor waveguides are used. One or more optical amplifiers may be semiconductor amplifier devices. Also, a different number of optical amplifiers may be used, and they may be located at different locations along a transmission line portion or element. Alternatively, optical amplifiers may be left out entirely.

As indicated, one or more dispersion slope compensating means may alternatively or additionally comprise an optical grating, such as a fibre grating. The most well known type of fibre grating is the Bragg grating, but the skilled man will appreciate that other types of fibre grating may alternatively be used, including side-etched gratings. The optical grating may alternatively comprise a semiconductor device, particularly if one or more sections of semiconductor waveguide are used.

It will be appreciated by the skilled man that a transmission line, element or portion according to the present invention may be of any desired physical length, within the normal constraints of optical pulse transmission systems, which the skilled may will be familiar with and so will not be detailed here.

What is claimed is:

1. An optical pulse transmission line portion having dispersion slope compensation, the transmission line portion comprising:

a first optical waveguide of a first length ($L_1$) having a first dispersion parameter ($D_1$) and a dispersion slope parameter ($S_1$) of a first sign, optically coupled to a first dispersion slope compensating unit of a second length ($L_2$) having a second dispersion parameter ($D_2$) and a dispersion slope parameter ($S_2$) of an opposite sign from the first sign, wherein the path average dispersion slope of the transmission line portion is substantially zero and is given by $$<S>=S_1L_1+S_2L_2$$

and the path average dispersion (<D>) of the transmission line portion is generally non zero, and is given by $$\langle D \rangle = \frac{D_1S_2 - D_2S_1}{S_2 - S_1};$$

and a second optical waveguide of a third length ($L_3$) having the first dispersion parameter ($D_1$) and the dispersion slope parameter ($S_1$) of the first sign and a second dispersion slope compensating unit of a fourth length ($L_4$) having the second dispersion parameter ($D_2$) and the dispersion slope parameter ($S_2$) of the opposite sign from the first sign, wherein the first and second optical waveguides and the first and second dispersion slope compensating units are optically coupled together in a symmetric dispersion map configuration.

2. An optical pulse transmission line portion according to claims 1 or 2, wherein the path average dispersion of the transmission line portion is wavelength independent.

3. An optical pulse transmission line portion according to claims 1 or 2, wherein the optical pulse transmission line portion is for inclusion in a wavelength division multiplexed optical pulse transmission system.

4. An optical pulse transmission line portion according to claim 1, wherein the optical pulse is a return-to-zero optical pulse.

5. An optical pulse transmission line portion according to claim 4, wherein the optical pulse is an optical soliton.

6. An optical pulse transmission line portion according to claim 1, wherein the optical pulse is a chirped return-to-zero optical signal.

7. An optical pulse transmission line portion according to claim 1, wherein the first optical waveguide and the first dispersion slope compensating unit are arranged in one of a precompensating dispersion map configuration and a post-compensating dispersion map configuration.

8. An optical pulse transmission line portion according to claim 7, wherein the transmission line portion further comprises an optical amplifier.

9. An optical pulse transmission line portion according to claims 8, wherein the optical amplifier is optically coupled to the dispersion map at one end of the dispersion map.

10. An optical pulse transmission line portion according to claims 8, wherein the optical amplifier is optically coupled to the dispersion map at a location along the dispersion map.

11. An optical purse transmission line portion according to claim 8, wherein the transmission line portion further comprises a second optical amplifier.

12. An optical pulse transmission line portion according to claim 11, wherein one of the first and second optical amplifiers is provided at an end of the dispersion map and the other of the first and second optical amplifiers is provided towards the middle of the dispersion map.

13. An optical pulse transmission line portion according to claim 8, wherein each optical amplifier is a fibre amplifier, such as an erbium doped fibre amplifier, or a fibre Raman amplifier.

14. An optical pulse transmission line portion according to claim 8, wherein each optical amplifier is a semiconductor optical amplifier device.

15. An optical pulse transmission line portion according to claim 8, wherein the first and second optical waveguides are a first optical fibre.

16. An optical pulse transmission line portion according to claim 15, wherein the first optical fibre is a transmission fibre such as standard monomode fibre, Lucent 2-wave fibre or Alcatel Terralight fibre.

17. An optical pulse transmission line portion according to claim 8, wherein the first and second dispersion slope compensating units comprise sections of a third optical waveguide.

18. An optical pulse transmission line portion according to claim 17, wherein the third optical waveguide is a second optical fibre, which may be a compensating fibre, such as dispersion compensating fibre or reverse dispersion fibre.

19. An optical pulse transmission line portion according to claim 8, wherein the first and second dispersion slope compensating units comprise sections of a fourth optical waveguide including an optical grating.

20. An optical pulse transmission line portion according to claim 19, wherein the fourth optical waveguide is a third optical fibre, and the optical grating is an optical fibre grating.

21. An optical pulse transmission line portion according to claim 20, wherein the optical grating is a fibre Bragg grating.

22. An optical pulse transmission line portion according to claim 1, wherein the first optical waveguide and the first dispersion slope compensating unit are arranged in a post-compensating dispersion map configuration.

23. An optical pulse transmission line having dispersion slope compensation, the optical pulse transmission line comprising a plurality of optical pulse transmission line portions, according to claim 1, connected in optical communication in series.

24. Optical pulse transmission line portion components for incorporation into an existing terrestrial communication line which comprises a first optical waveguide of a first length ($L_1$) having a first dispersion parameter ($D_1$) and a dispersion slope parameter (S) of a first sign, a second optical waveguide of a third length ($L_3$) having the first dispersion parameter ($D_1$) and the dispersion slope parameter ($S_1$) of the first sign, the components comprising:

a first dispersion slope compensating unit of a second length ($L_2$) having a second dispersion parameter ($D_2$) and a dispersion slope parameter ($S_2$) of an opposite sign from the first sign;

a second dispersion slope compensating unit of a fourth length ($L_4$) having the second dispersion parameter (D2) and the dispersion slope parameter ($S_2$) of the opposite sign; and a first dispersion slope compensating unit being connectable in optical communication with the first optical waveguide to form therewith an optical pulse transmission line portion having compensated dispersion slope, wherein the path average dispersion slope of the transmission line portion is substantially zero and is given by $$<S>=S_1L_1+S_2L_2$$

the path average dispersion (<D>) of the transmission line portion is generally non zero, and is given by $$\langle D \rangle = \frac{D_1S_2 - D_2S_1}{S_2 - S_1},$$

and the first and second optical waveguides and the first and second dispersion slope compensating units are optically coupled together in a symmetric dispersion map configuration.

25. Optical pulse transmission line portion components according to claim 24, wherein the transmission line portion components further comprise a first optical amplifier, being connectable in optical communication with the optical pulse transmission line portion.

26. Optical pulse transmission line portion components according to claim 24, wherein the transmission line portion components further comprise the second dispersion slope compensating unit being connectable in optical communication with one or more of the aforementioned components, and the first and second optical waveguides.

27. Optical pulse transmission line portion components according to claim 26, wherein the transmission line portion components further comprise a second optical amplifier connectable in optical communication with one or more of the aforementioned components, and the first and second optical waveguides.

28. An optical pulse transmission line portion components according to any one of claims 24, 25, 26, and 27 wherein the optical pulse transmission line so formed comprises a first optical waveguide of a first length ($L_1$) having a first dispersion parameter ($D_1$) and a dispersion slope parameter ($S_1$) of a first sign, optically coupled to a first dispersion slope compensating unit of a second length ($L_2$) having a second dispersion parameter ($D_2$) and a dispersion slope parameter ($S_2$) of an opposite sign from the first sign, wherein the oath average dispersion slope of the transmission line portion is substantially zero, and is given by $$<S>=S_1L_1+S_2L_2$$

and the path average dispersion (<D>) of the transmission line portion is generally non zero, and is given by $$\langle D \rangle = \frac{D_1 S_2 - D_2 S_1}{S_2 - S_1};$$

and a second optical waveguide of a third length ($L_3$) having the first dispersion parameter ($D_1$) and the dispersion slope parameter ($S_1$) of the first sign and a second dispersion slope compensating unit of a fourth length ($L_4$) having the second dispersion parameter ($D_2$) and the dispersion slope parameter ($S_2$) of the opposite sign from the first sign, wherein the first and second optical waveguides and the first and second dispersion slope compensating units are optically coupled together in a symmetric dispersion map configuration.

29. An optical pulse transmission line element having dispersion compensation and dispersion slope compensation, the transmission line element comprising:

a first optical waveguide of a first length ($L_1$) having a first dispersion parameter ($D_1$) and a first dispersion slope parameter ($S_1$).

a first dispersion slope compensating unit of a second length ($L_2$) having a second dispersion parameter ($D_2$) and a second dispersion slope parameter ($S_2$), the first dispersion slope compensating unit comprising two sections of a compensating optical fibre, being one of reverse dispersion fibre and dispersion compensating fibre, and a second dispersion slope compensating unit of a third length ($L_3$) having a third dispersion parameter ($D_3$) and a third dispersion slope parameter ($S_3$), the first optical waveguide, the first dispersion slope compensating unit and the second dispersion slope compensating unit being connected together in optical communication to form the transmission line element, wherein the path average dispersion slope of the transmission line element is substantially zero and is given by $$<S>=S_1L_1+S_2L_2+S_3L_3, \text{ and}$$

the path average dispersion (<D>) of the transmission line element, having a total length $L=L_1+L_2+L_3$ is given by $$\langle D \rangle = \frac{D_2 S_3 - D_3 S_2}{S_3 - S_2}\left(1 - \frac{L_1}{L}\right) + \frac{L_1}{L}\frac{D_1(S_3-S_2)+(D_2-D_3)S_1}{S_3-S_2}.$$

30. A method of manufacturing an optical waveguide part for inclusion in an optical pulse transmission line portion, the optical waveguide part optically coupling first to fourth waveguides, the method including:

selecting the desired average dispersion (<D>) of the transmission line portion;

then selecting a dispersion parameter ($D_1$) of the first and second waveguides, a dispersion slope parameter ($S_1$) of the first and second waveguides, a dispersion parameter ($D_2$) of the third and fourth waveguides, a dispersion slope parameter ($S_2$) of the third and fourth waveguides such that the following relationship is satisfied $$\langle D \rangle = \frac{D_1 S_2 - D_2 S_1}{S_2 - S_1};$$

and symmetrically configuring a dispersion map of the optical pulse transmission line portion including the first to fourth waveguides.

31. A method according to claim 30 wherein each optical waveguide comprises an optical fibre.

32. A method according to claim 30, wherein each optical waveguide comprises a semiconductor waveguide.

33. A method according to any one of claims 30 through 32, wherein the average dispersion of the transmission line portion is anomalous, zero or normal.

34. A method according to claim 23, wherein the average dispersion is small, typically less than 1 picosecond/ nanometer/kilometer.

* * * * *

UNITED STATES PATENT AND TRADEMARK OFFICE
CERTIFICATE OF CORRECTION

PATENT NO.    : 6,826,340 B2
DATED         : November 30, 2004
INVENTOR(S)   : Ian Bennion et al.

It is certified that error appears in the above-identified patent and that said Letters Patent is hereby corrected as shown below:

Column 19,
Line 27, delete "or 2".

Column 20,
Line 40, change "(S)" to -- $(S_1)$;
Line 50, change "(D2)" to -- $(D_2)$ --.

Signed and Sealed this

Second Day of August, 2005

JON W. DUDAS
*Director of the United States Patent and Trademark Office*